United States Patent [19]
Forsythe et al.

[11] 4,193,623
[45] Mar. 18, 1980

[54] CONCEALED DEVICE FOR REMOVING ANIMAL DROPPINGS

[76] Inventors: Marlene L. Forsythe, 11 Wiswall Cir., Wellesley, Mass. 02181; Amelia Laughlin; Wayne Laughlin, both of 19 N. Main St., Muncy, Pa. 17756

[21] Appl. No.: 5,217

[22] Filed: Jan. 22, 1979

[51] Int. Cl.² ............................................. A47F 13/06
[52] U.S. Cl. .................................... 294/1 BB; 119/1; 135/16
[58] Field of Search ................. 294/1 BB, 1 B, 1 BA, 294/19 R; 119/1 R; 135/16, DIG. 2

[56] References Cited

U.S. PATENT DOCUMENTS

| | | | |
|---|---|---|---|
| 3,744,453 | 8/1973 | Deitch | 294/1 BB |
| 3,912,316 | 10/1975 | Veech | 294/1 BA |

*Primary Examiner*—James B. Marbert
*Attorney, Agent, or Firm*—Cesari and McKenna

[57] ABSTRACT

A device for removing animal litter which is structured to normally present the appearance of an ordinary umbrella. The device includes an elongated handle and a shroud encircling the handle which can be opened to reveal a bag-carrying arm which can be swung from a stowed position adjacent the handle when the shroud encircles the handle to a lower operative position to receive litter when the shroud is in its open position.

7 Claims, 3 Drawing Figures

CONCEALED DEVICE FOR REMOVING ANIMAL DROPPINGS

BACKGROUND OF THE INVENTION

This invention relates in general to a sanitary device. It relates more particularly to a portable sanitary apparatus for disposing of dog and cat litter.

In many cities and towns due to expanding population, leash laws have been enacted requiring that dogs be kept under the positive control of their masters as long as they are out in the public ways. Consequently, in order to exercise their pets, dog owners customarily walk their dog at certain times during the day. It is usually during these times that the dog chooses to relieve himself at a selected location or locations along the course of the walk. However, these locations are usually also in the public way. As a result, in a number of urban areas, legislation has been passed requiring dog owners to clean up after their pets in such instances. Various devices have been proposed to facilitate carrying out that task.

Usually these prior devices comprise some form of stick or handle whose lower end terminates in some sort of receptacle such as a pan, tray or bag. The dog owners carry these utensils when they are taking their dogs for their "constitutional". These receptacles are usually extensible in one manner or another so that at the critical moment when the dog is about to relieve himself, the owner extends the receptacle and positions it under the dog to catch the droppings. The receptacle is then retracted to its original position and the owner and dog continue on their way. Examples of such prior devices are disclosed in U.S. Pat. Nos. 3,744,453; 3,767,246; 3,868,135; 3,977,422; 4,005,892; and 4,042,269.

These prior devices for removing animal droppings have two main disadvantages. First, their litter-receiving receptacle are situated very close to the end of the handle. Consequently, the dog owner must position himself very close to the animal in order to catch the droppings. Such proximity may disconcert the animal so that he does not do his duty in a prompt and predictable fashion. Secondly, prior litter-removing devices are rather unique-looking contraptions which tend to draw attention to the dog owners as they walk along the streets. This may cause some degree of embarrassment to some of those owners to the extent that they do not even bring the utensil with them, thereby defeating its purpose.

SUMMARY OF THE INVENTION

Accordingly, the present invention aims to provide an improved device for removing animal droppings which is fully concealed from view when not in actual use.

A further object of the invention is to provide a device of this kind which should not disturb or distract the dog while the device performs its intended function.

Another object of the invention is to provide a device for removing animal droppings which is lightweight and easy to use.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

In general, the present device is structured to present the appearance, when not in use, of an ordinary umbrella. It comprises an elongated handle having a cane-like top. Pivoted near the lower end of the handle is an elongated arm which is somewhat shorter than the handle. Secured to the free end of the arm is a ring to which is removably secured the open end of an ordinary plastic bag. The arm is swingable between an upper or stowed position adjacent to the handle to a lower or extended position wherein it is oriented horizontally parallel to the ground. The arm is raised and lowered between its two positions by means of a cord having one end attached to the arm midway along its length. The cord thence passes through an eye secured at approximate mid-point along the handle with the opposite end of the cord terminating in a knob or ring situated adjacent the top of the handle. The length of the cord is such that when the arm is in its lower position, the ring or knob at the end of the cord engages the eye on the handle thereby limiting the extension of the arm. To raise the arm, the user pulls or draws the cord upwards which lifts the arm toward the handle with the knob or ring being engaged over a hook near the upper end of the handle.

In order to conceal the bag and arm, the handle and arm are normally encompassed or encircled by a shroud supported by ribs secured near the lower end of the handle so that the shroud has the appearance of a folded umbrella canopy. When the arm is to be moved to its lower position in preparation for use, side edges of the canopy are released permitting the canopy to be opened and folded away from the arm to enable the arm to be lowered to its operative position adjacent the ground.

It should be noted that, in this position, the litter bag at the end of the arm is located an appreciable distance from the dog owner so that his presence should not disturb the dog. As soon as the dog has done his duty, the owner retracts the bag supporting arm to its stowed position and resecures the shroud about the handle and bag. Consequently, as he proceeds along his walk, he appears as nothing more than an ordinary umbrella-carrying, dog-walking pedestrian.

BRIEF DESCRIPTION OF THE DRAWING

For a fuller understanding of the nature and objects of the invention, reference should be had to the following detailed description, taken in connection with the accompanying drawing, in which.

DESCRIPTION OF THE PREFERRED EMBODIMENT

Figure 1:
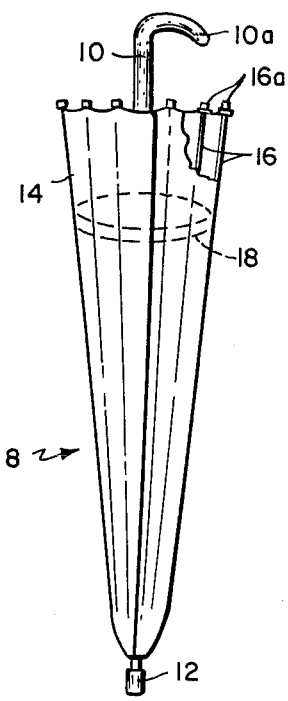
FIG. 1 is a perspective view of a device for removing animal droppings made in accordance with this invention showing the device in its fully-stowed position.

Turning now to FIG. 1 of the drawing, the subject device shown generally at 8 normally has the appearance of an ordinary umbrella. As such, it includes a handle 10 whose upper end terminates in a cane-like handgrip 10a. The lower end of handle 10 is desirably provided with a rubber cap 12 to minimize slippage with the ground. Encircling handle 10 is a shroud 14 which resembles a usual folded umbrella canopy. The shroud is supported by an array of elongated stays 16 whose lower ends are secured to a slide 17 mounted near the lower end of handle 10. The shroud 14 is retained in its gathered condition illustrated in FIG. 1 by one or more releasable elastic band 18 secured to the inside of shroud 14. Normally, the dog owner while walking his dog carries the device 8 so that he appears to others as no more than an umbrella-carrying pedestrian.

Figure 3:
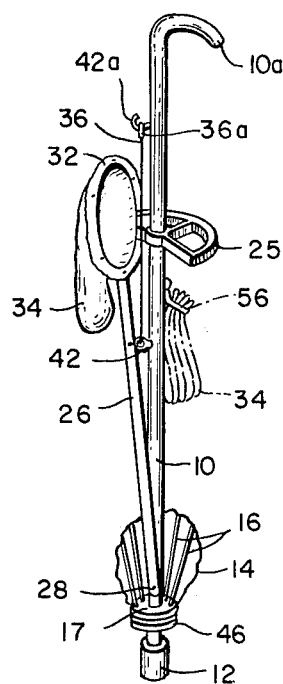
FIG. 3 is a view similar to FIG. 1 with parts cut away illustrating the device in its stowed position in greater detail.
Figure 2:
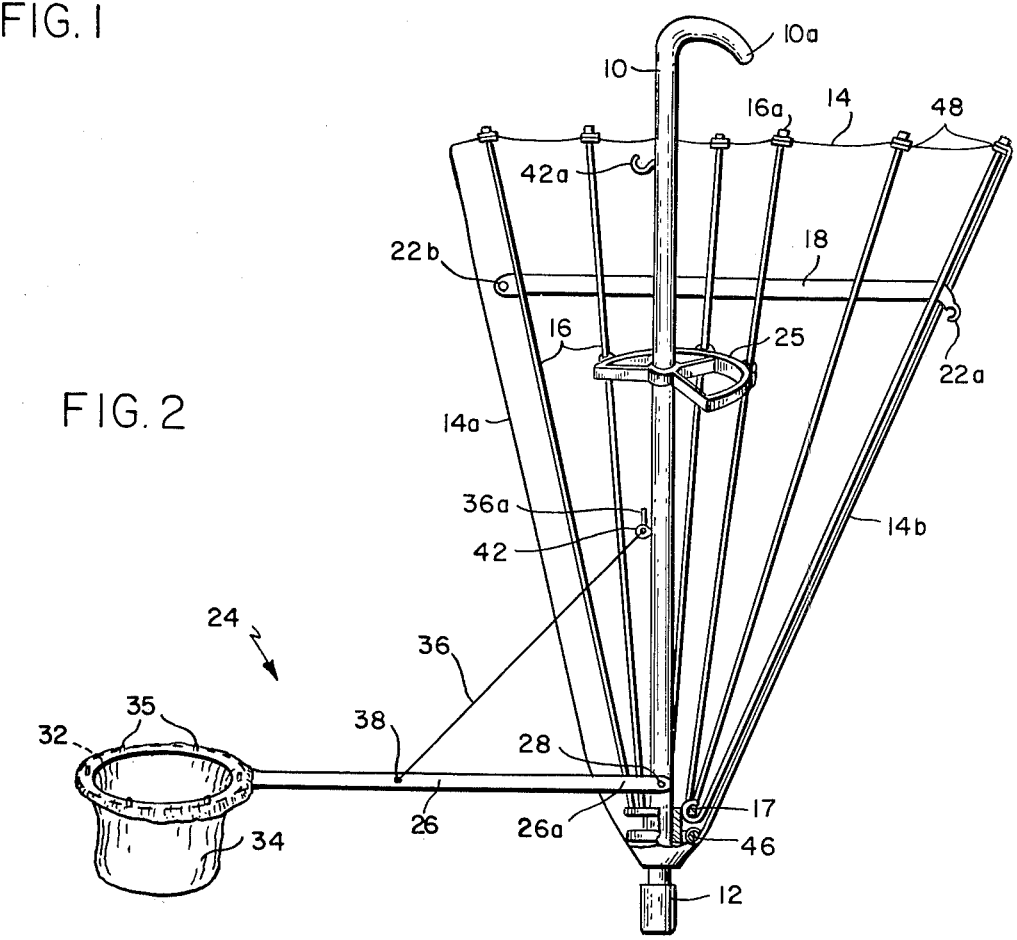
FIG. 2 is a similar view illustrating the same device in its fully-operative extended position.

Turning now to FIGS. 2 and 3, when the owner's dog wishes to relieve himself, the owner opens the shroud 14 by disengaging hook-and-eye pair 22a and 22b located at the opposite ends of bands 18. The elastic bands 18 contract to some extent thereby gathering the shroud 14 together at one side of handle 10 so as to reveal the actual litter-catching assembly indicated generally at 24. In this several of the stays 16 on the side of handle 10 opposite assembly 24 are affixed to a collar 25 secured about half way up on handle 10. The collar extends on the order of 180° to 270° about handle 10 with the missing sector being positioned adjacent assembly 24. When bands 18 are released collar 25 supports stays 16 and shroud 14 out of the way of assembly 24.

Assembly 24 comprises an arm 26 having one end 26a swingably connected to handle 10 near its lower end by a pivot 28. Secured to the opposite or free end of arm 26 is a hoop or ring 32 which removably supports a standard plastic bag 34. The securement of the bag 34 to ring 32 may be accomplished in a variety of ways. In the embodiment illustrated in FIG. 2, the ring is provided with a circumferential array of pins or hooks 35. The edge margin of the bag 34 is passed up inside the ring and engaged over the top thereof with its edge margin being impaled on the pins 35 as shown.

The bag carrying arm 26 is swingable relative to handle 10 between a raised or stowed position wherein it lies against and more or less parallel to handle 10 as shown in FIG. 3 and an operative lower position illustrated in FIG. 2 wherein the arm is oriented more or less horizontally parallel to the ground. Arm 26 is moved between its two positions by means of a cord 36 whose lower end is secured at 38 to arm 26 midway along the length of the arm.

Cord 36 extends through an eye 42 secured mid-way along the length of handle 10. The eye 42 is located so that when the arm 26 is in its raised position shown in FIG. 3, the eye lies more or less adjacent to the securing point 38 of the cord to the arm. Preferably the upper end of cord 36 is provided with a knob or ring 36a whose engagement with the eye 42 limits the extent to which the arm 26 can swing downward relative to handle 10. Ideally, the length of the cord 36 is such that the ring 36a engages the eye 42 when the arm is in its lower horizontal position illustrated in FIG. 2. Arm 26 is raised to its stowed position shown in FIG. 3 by drawing up on the cord 36. A hook 42a is secured near the upper end 10a of handle 10. To retain the arm in its raised position ring 36a is engaged over the hook 42a.

The combined length of the ring 32 and the arm 26 should be less than the length of handle 10 so that when the arm is in its stowed position, it is not visible above the shroud 14. Also the bag 34 should be long or deep enough so that, when the arm is moved to its raised position, the contents of the bag does not become dislodged.

As best shown in FIG. 2, the shroud 14 is generally fan-shaped having opposite side edges 14a and 14b. Preferably, each elastic band 18 is sewed to the inside of the shroud 14 and extends from one edge, say edge 14b, to a point spaced from the opposite edge 14a. A hook 22a is secured to the shroud edge 14b and to the corresponding end of band 18. The eye 22b for that hook is sewed to shroud 14 at the adjacent end of that band 18. Thus the eye is spaced in from the shroud edge 14a so that when the corresponding hook and eye are joined as in FIG. 1, the shroud edge 14a will overlap edge 14b so as to conceal the hook and eye pairs.

Preferably the shroud 14 is secured to stays 16 and handle 10 in such a way that it can be removed for washing should that need arise. For this, the lower, narrow end of the shroud 14 is hemmed around a ring 46 which can be engaged around the lower end of handle 10 and seated under slide 17, by removing cap 12 temporarily. The upper, wide edge of the shroud is provided with a set of spaced-apart eyeletted openings 48 the number of which corresponds to the number of stays 16. Each opening 48 engages over a flanged cap 16a affixed to the upper end of the corresponding stay 16. In an alternative construction, in lieu of openings 48, the caps 16a can be sewed into the upper edge of shroud 14 as is done in the usual umbrella. The length or depth of shroud 14 is such that when the ring 46 is engaged on handle 10 and the shroud is stretched up around stays 16 so that the openings are engaged on caps 16a, the stays are bowed slightly which tensions the shroud 14 to some extent in a vertical direction.

With the shroud vertically tensioned as aforesaid, when the arm 26 is in its raised position and the hook-and-eye pairs 22a and 22b are secured together, the shroud is gathered relatively tightly about the arm 26, bag 34 and handle 10 as depicted in FIG. 1, with the shroud edge 14a overlapping edge 14b so that, to the casual observer, the device looks like an ordinary umbrella. On the other hand, when the hook-and-eye pairs are disengaged to open the shroud, the shroud, still in its vertically tensioned condition, is drawn back by the elastic bands 18 and gathered at one side of the handle 10 out of the way of the arm 26 which can then be lowered to its operative position as described above.

If desired, a hook indicated in dotted lines at 56 can be secured to handle 10 inside shroud 14 to support an additional supply of plastic bags 34, all as shown in dotted lines in FIG. 3. Also the same or another similar hook can be provided to carry one or more used bags 34 if that need should arise.

It is apparent from the foregoing that the described device for removing animal litter provides definite advantages to both animal and owner. Yet is it relatively simple in construction and easy to maintain. Therefore it should prove to be a very useful and marketable utensil, particularly for the urban dweller.

It will thus be seen that the objects set forth above among those made apparent from the preceding description are efficiently attained and, since certain changes may be made in the above construction without departing from the scope of the invention, it is intended that all matter contained in the above description or shown in the accompanying drawing shall be interpreted as illustrative and not in a limiting sense.

It will also be understood that the following claims are intended to cover all of the generic and specific features of the invention herein described.

We claim:
1. A device for removing animal litter comprising
  A. an elongated handle,

B. an elongated arm,

C. means for pivotally connecting one end of the arm near the lower end of the handle so that the arm is swingable between a raised position wherein it lies adjacent to the handle and a lower position wherein it is oriented more or less horizontally, D. bag securing means affixed to the opposite end of the arm, the total length of the arm and bag-securing means being less than that of the handle, E. means operable adjacent the upper end of the handle for swinging the arm between its two positions, F. a flexible shroud having a lower end secured near the lower end of the handle and having an upper end which extends above the bag-securing means when said arm is in its raised position, and G. means for supporting the upper end of the shroud so that the shroud can be retained in a closed position wherein the shroud encircles and conceals the arm and bag-supporting means or an open position wherein said shroud reveals said arm and bag-supporting means.

2. The device defined in claim 1 and further including means for removably retaining said shroud in its closed position.

3. The device defined in claim 2 wherein the retaining means comprises

A. one or more elastic bands secured transversely to said shroud, and

B. mating fastener means secured to the opposite side edges of said shroud adjacent the opposite edges of the elastic bands.

4. The device defined in claim 1 wherein the shroud supporting means comprise

A. an array of elongated ribs,

B. means for securing the lower ends of the ribs near the lower end of the handle, and C. means connecting at least some of said ribs at an elevated location thereon to said handle.

5. The device defined in claim 4 wherein

A. the upper edge of the shroud is removably secured to the upper ends of the ribs at spaced-apart locations along said upper edge, and B. the lower edge of the shroud is removably secured near the lower end of the handle.

6. The device defined in claim 1 wherein the swinging means comprises

A. a cord having one end connected to said arm at a location spaced away from said pivot means, B. at least one eye secured to said handle for receiving said cord so that when the opposite end of said cord is pulled upwards, said arm is swung to its upper position, and C. means for securing said cord to the handle so as to maintain said arm in its raised position.

7. The device defined in claim 6 wherein said securing means comprises

A. a ring attached to the free end of the cord for engaging the eye so as to limit the downward swinging motion of said arm relative to said handle, and B. a hook attached to the handle near its upper end for engaging the ring when the arm is in its raised position.

* * * * *